US005568242A

United States Patent [19]

Sasame et al.

[11] Patent Number: 5,568,242

[45] Date of Patent: Oct. 22, 1996

[54] ELECTROPHOTOGRAPHIC PHOTOSENSITIVE MEMBER, IMAGE FORMING APPARATUS AND PROCESS UNIT HAVING THIS ELECTROPHOTOGRAPHIC PHOTOSENSITIVE MEMBER

[75] Inventors: Hiroshi Sasame; Hideki Anayama, both of Yokohama; Yoichiro Maebashi, Kawasaki, all of Japan

[73] Assignee: Canon Kabushiki Kaisha, Tokyo, Japan

[21] Appl. No.: 394,262

[22] Filed: Feb. 24, 1995

[30] Foreign Application Priority Data

Feb. 28, 1994 [JP] Japan .................................... 6-029647

[51] Int. Cl.$^{6}$ ........................................ G01B 7/06

[52] U.S. Cl. ........................................ 355/299; 430/66

[58] Field of Search .......................... 430/96, 66; 355/299

[56] References Cited

U.S. PATENT DOCUMENTS

| | | | |
|---|---|---|---|
| 5,258,252 | 11/1993 | Sakai et al. | 430/96 |
| 5,374,494 | 12/1994 | Kashimura et al. | 430/96 |

FOREIGN PATENT DOCUMENTS

| | | |
|---|---|---|
| 5-223513 | 8/1993 | Japan . |

*Primary Examiner*—John Goodrow

*Attorney, Agent, or Firm*—Fitzpatrick, Cella, Harper & Scinto

[57] ABSTRACT

An electrophotographic photosensitive member is comprised of a support and a photosensitive layer. The photosensitive layer is of such a nature that it becomes gradually more scrapable from its surface toward its interior.

15 Claims, 1 Drawing Sheet

FIGURE
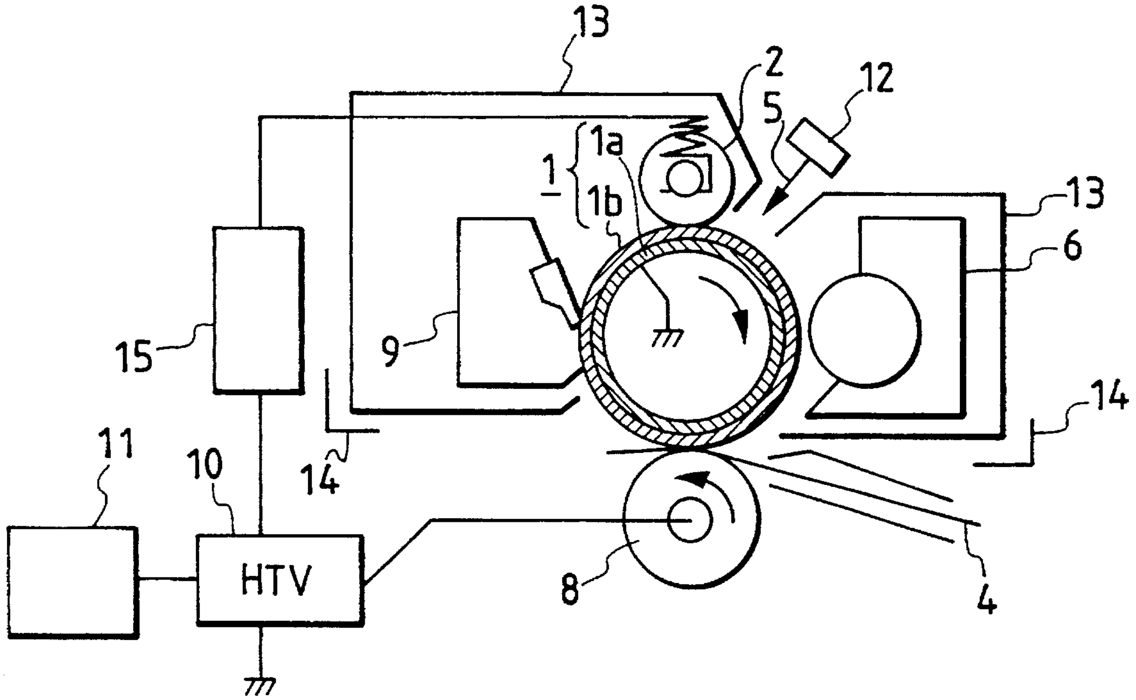

ELECTROPHOTOGRAPHIC PHOTOSENSITIVE MEMBER, IMAGE FORMING APPARATUS AND PROCESS UNIT HAVING THIS ELECTROPHOTOGRAPHIC PHOTOSENSITIVE MEMBER

BACKGROUND OF THE INVENTION

1. Field of the Invention

This invention relates to an electrophotographic photosensitive member, and an image forming apparatus and a process unit having the electrophotographic photosensitive member.

2. Related Background Art

Hitherto, in electrophotographic recording processes, electrophotographic photosensitive members are gradually contaminated by components of transfer mediums and discharge products formed at the time of charging, not only because of toners remaining after transfer but also as a result of repeated use. Such contamination of electrophotographic photosensitive members results in a decrease in their surface electrical resistivity thus causing disturbance of electrostatic images and also a melt adhesion of toner to the surfaces of electrophotographic photosensitive members to cause serious damage to images.

Accordingly, a measure conventionally taken is to intentionally abrade the surface of an electrophotographic photosensitive member with a cleaning blade or the like to make the surface of the electrophotographic photosensitive member always new so that good images can always be obtained. This enables maintenance of good images since the surfaces of electrophotographic photosensitive members are always renewed.

However, contaminants adhered to the surfaces of electrophotographic photosensitive members become more difficult to remove as the photosensitive members are repeatedly used. Hence, in conventional photosensitive members, their surfaces are excessively abraded from initials use so that the contaminants are removed even after the use of photosensitive members are used for a long period of time. In other words, an attempt to more completely remove contaminants results in a shorter lifetime of electrophotographic photosensitive members.

Thus, there is a problem that an attempt to maintain stable images makes their lifetime short because of an excessive abrasion of photosensitive layers of electrophotographic photosensitive members. On the other hand, an attempt to make their lifetime longer by less abrasion of the photosensitive layers makes it impossible to maintain good images.

Meanwhile, a method for detecting the layer thickness of a photosensitive layer is proposed (e.g., Japanese Patent Application Laid-open No. 5-223513). This is a method in which electric currents flowing when charges are eliminated from a photosensitive member brought into a charged state (or the photosensitive member brought into a charge-eliminated state is charged) are detected and the capacitance as a capacitor is measured therefrom to calculate the layer thickness of a photosensitive layer. In this way, appropriate maintenance of photosensitive members can be made.

SUMMARY OF THE INVENTION

An object of the present invention is to provide an electrophotographic photosensitive member that can always produced good images and have a long lifetime, and an image forming apparatus and a process unit that have such an electrophotographic photosensitive member.

The electrophotographic photosensitive member of the present invention comprises a support and a photosensitive layer provided thereon, which layer has a portion with a scrapability increasing in the direction from its surface toward its interior.

The image forming apparatus of the present invention comprises the above electrophotographic photosensitive member, a charging member for electrostatically charging the electrophotographic photosensitive member, an exposure means for exposing the electrophotographic photosensitive member thus charged to form an electrostatic latent image, a developing means for developing using a toner the electrostatic latent image formed on the electrophotographic photosensitive member, and a cleaning means for cleaning the surface of the electrophotographic photosensitive member.

The process unit of the present invention comprises the above electrophotographic photosensitive member together with which at least one of a charging member, a developing means and a cleaning means are held into one unit.

BRIEF DESCRIPTION OF THE DRAWING

Figure is a side view to show an example of an image forming apparatus according to the present invention.

DESCRIPTION OF THE PREFERRED EMBODIMENTS

The electrophotographic photosensitive member of the present invention comprises a support and provided thereon a photosensitive layer, which layer is of such a nature that it becomes gradually more scrapable in the direction from its surface toward its interior. More specifically, the present invention, a cleaning means is brought into touch with the surface of the electrophotographic photosensitive member to abrade its surface so that contaminants such as toner remaining on the surface of the photosensitive member are removed, where the photosensitive layer of the electrophotographic photosensitive member has a scrapability that increases with the progress of abrasion. The scrapability of the electrophotographic photosensitive member on its photosensitive layer will be detailed later.

Thus, at the beginning of use of the electrophotographic photosensitive member, the photosensitive layer is not unnecessarily scraped off to enable elongation of the service life of the photosensitive member.

In the present invention, the scrapability of the photosensitive layer is measured and evaluated in the following way.

An electrophotographic photosensitive member to be measured and evaluated is set to a laser beam printer (trade name: Laser Jet 4 Plus; manufactured by Hewlett Packard Co.) and printing is carried out at a temperature of 25° C. at a humidity of 50% RH, where, upon printing on 500 sheets of recording paper, the depth of scrape-off of the photosensitive layer is measured by a layer thickness detecting means and the scrapability is evaluated according to the extent of scrape-off of the photosensitive layer. More specifically, the depth of scrape-off of the photosensitive layer after the printing on the first sheet of recording paper up to the printing on the 500th sheet of recording paper is regarded as $\alpha 1$; the depth of scrape-off after the printing on the 501st sheet of recording paper up to the printing on the 1,000th sheet of recording paper, as $\alpha 2$; the depth of scrape-off after the printing on the 1,001st sheet of recording paper up to the printing on the 1,500th sheet of recording paper, as α3; the depth of scrape-off after the printing on the 1,501st sheet of recording paper up to the printing on the 2,000th sheet of recording paper, as α4; and subsequently the depth of scrape-off after the printing on the {500(n−1)+1}th sheet of recording paper up to the printing on the 500n-th sheet of recording paper, as αn. In this way, the scrapability is expressed as the depth of scrape-off αn on every 500 sheets of recording paper.

The scrapability is evaluated while the printing is carried out using the Laser Jet 4 Plus in the sheet-by-sheet intermittent mode (a mode in which printing is first carried out on one sheet of recording paper and the next printing is carried out after the rotation of the photosensitive member has been completely stopped after the first printing and image signals are again inputted). Here, images are formed in a pattern composed of horizontal lines of 2 dots thick. The distance between each horizontal line corresponds to 99 dots.

In the present invention, the extent to which the scrapability increases may preferably be at least 10 μm, more preferably 25 μm, and particularly preferably 30 μm, in the depth direction from the surface of the photosensitive layer of an electrophotographic photosensitive member unused. Alternatively, the scrapability may be so designed as to be constant to a certain depth and thereafter increase to the extent of 10 μm, more preferably 25 μm, and particularly preferably 30 μm, in the depth direction. The extent to which the scrapability is constant may preferably be within the range of from 3 to 8 μm in depth from the surface of the photosensitive layer of the electrophotographic photosensitive member unused.

In the electrophotographic photosensitive member of the present invention, the scrapability may preferably increase in such a rate that the scrapability becomes 1.2 to 3.0 times for each 10 μm advance in the direction from the surface of the photosensitive layer toward the inside.

The electrophotographic photosensitive member of the present invention may preferably provide a depth of scrape-off α1 of from 0.3 to 0.9 μm, which is the depth of scrape-off after the printing in the unused state up to the printing on 500 sheets of recording paper.

The electrophotographic photosensitive member of the present invention has the photosensitive layer on a support. The photosensitive layer that can be used may be comprised of a charge generation layer, a charge transport layer and optionally a protective layer which are superimposed thereon. The charge generation layer contains a charge-generating material capable of generating charges upon exposure. The charge transport layer contains a charge-transporting material capable of transporting the charges thus generated. The charge generation layer and the charge transport layer may be formed in the order of the charge generation layer and the charge transport layer from the support side, or in the reverse order.

The charge generation layer can be formed by depositing the charge-generating material or applying a coating composition prepared by dispersing it together with a suitable binder (the binder is optional).

The charge-generating material may include, for example, azo pigments as exemplified by monoazo, bisazo and trisazo, phthalocyanine pigments as exemplified by metal phthalocyanines and metal-free phthalocyanines, indigo pigments as exemplified by indigo and thioindigo, polycyclic quinone pigments as exemplified by anthraquinone and pyrenequinone, perylene pigments as exemplified by perylene acid anhydrides and perylene acid imides, squarilium dyes, pyrylium or thiopyrylium salts and triphenylmethane dyes. Inorganic materials such as selenium, selenium-tellurium and amorphous silicon may also be used as the charge-generating material.

The binder used in the charge generation layer may be selected from a vast range of insulating materials or organic photoconductive polymers. For example, the insulating materials may include polyvinyl butyral, polyallylate (e.g., a condensation polymerization product of bisphenol-A with phthalic acid), polycarbonate (e.g., polycarbonate-Z, modified polycarbonate), polyester, phenoxy resins, acrylic resins, polyacrylamide, polyamide, cellulose resins, urethane resins, epoxy resins, casein, and polyvinyl alcohol. The organic photoconductive polymers may include polyvinyl carbazole, polyvinyl anthrathene and polyvinyl pyrene.

The charge generation layer may preferably have a layer thickness of from 0.01 to 15 μm, and more preferably from 0.05 to 5 μm. When the binder is used, the charge-generating material and the binder may preferably be in a weight ratio of from 10:1 to 1:20.

Organic solvents used when the charge-generating material is formed by coating may be selected taking account of solubility or dispersion stability of the resin and charge-generating material used. It is possible to use alcohols, sulfoxides, ethers, esters, aliphatic halogenated hydrocarbons or aromatic compounds.

The charge transport layer can be formed using a coating solution prepared by dissolving a charge-transporting material in a binder having film forming properties. As the charge-transporting material, there may be exemplified hydrazone compounds, stilbene compounds, pyrazoline compounds, oxazole compounds, thiazole compounds and triazoleamine compounds. Any of these charge-transporting materials may be used alone or in combination of two or more kinds.

The binder used in the charge transport layer may include, for example, polyvinyl butyral, polyester, polycarbonate (e.g., polycarbonate Z, modified polycarbonate), nylon, polyimide, polyallylate, polyurethane, a styrene-butadiene copolymer, a styrene-acrylic acid copolymer, and a styrene-acrylonitrile copolymer. Organic solvents used when the charge transport layer is formed by coating may be the same as those used when the charge generation layer is formed by coating.

The charge generation layer may preferably have a layer thickness of from 5 to 50 μm, and more preferably from 8 to 20 μm. The charge-transporting material and the binder may preferably be in a weight ratio of from 5:1 to 1:5, and more preferably from 3:1 to 1:3.

The photosensitive layer is not necessarily required to be separated into the charge generation layer and the charge transport layer, and instead may be formed in a single layer containing both the charge-generating material and the charge-transporting material.

In the case when the photosensitive layer is formed in a single layer, the photosensitive layer may preferably have a layer thickness of from 5 to 100 μm, and more preferably from 10 to 60 μm. In the photosensitive layer of a single-layer type, the charge-generating material and the charge-transporting material may each preferably be contained in an amount of from 10 to 70% by weight, and more preferably from 20 to 70% by weight, based on the weight of each material The support can be formed of a conductive material as exemplified by aluminum, an aluminum alloy or stainless steel. It is also possible to use a support made of plastic, paper or metal on the surface of which a conductive surface layer is formed. As the conductive surface layer, it is possible to use a vacuum-deposited film of aluminum, an aluminum alloy or an indium oxide-tin oxide alloy, or a coating film formed by coating a mixture of a binder with conductive particles (e.g., carbon black and tin oxide particles). The conductive surface layer may preferably have a thickness of from 1 to 30 μm. The support may preferably be in the form of a cylinder, a belt or a sheet.

A subbing layer having a barrier function and an adhesion function may be optionally provided between the support or conductive surface layer and the photosensitive layer. The subbing layer can be formed of, e.g., casein, polyvinyl alcohol, nitrocellulose, an ethylene-acrylic acid copolymer, polyamide, modified polyamide, polyurethane, gelatin, aluminum oxide or the like. The subbing layer may preferably have a layer thickness of not more than 5 μm, and more preferably from 0.5 to 3 μm. The subbing layer may also preferably have a resistivity of $10^7$ Ω·cm.

On the surface of the electrophotographic photosensitive member, a protective layer may be optionally provided. The protective layer can be formed by coating the photosensitive layer with a solution prepared by dissolving a resin such as polyvinyl butyral, polyester, polycarbonate (e.g., polycarbonate Z, modified polycarbonate), nylon, polyimide, polyallylate, polyurethane, a styrene-butadiene copolymer, a styrene-acrylic acid copolymer or a styrene-acrylonitrile copolymer in a suitable solvent, followed by drying. The protective layer may preferably have a layer thickness of from 0.05 to 20 μm. In the protective layer, conductive particles or an ultraviolet absorbent may also be incorporated.

The electrophotographic photosensitive member of the present invention can be obtained by forming the photosensitive layer materials into a film or films on the support by vacuum deposition, sputtering or CVD or by a coating process such as dip coating, spray coating, spin coating, roll coating, Mayer bar coating or blade coating, using a suitable binder resin in combination.

In order to obtain the electrophotographic photosensitive member having the photosensitive layer which is of such a nature that it becomes gradually more scrapable in the direction from its surface toward the interior, it is preferable, for example, to make molecular weights of the constituents of the photosensitive layer smaller, or glass transition points thereof higher, from the surface toward the interior. Alternatively, a fluorine resin may be incorporated in the photosensitive layer in such a manner that the content of the fluorine resin becomes smaller in the direction from the surface of the photosensitive member toward the interior. Thus, the coefficient of friction can be made smaller from the surface toward the interior, so that the photosensitive layer becomes more readily scrapable toward the interior.

An image forming apparatus employing the electrophotographic photosensitive member of the present invention will be described with reference to the Figure.

An electrophotographic photosensitive member 1 of the present invention has a support la which is grounded, and is rotated in the direction of an arrow. A charging member 2 comes into contact with a photosensitive layer **1*b* of the electrophotographic photosensitive member 1, and this charging member 2 electrostatically charges the photosensitive member 1 to a positive or negative given polarity. A positive or negative DC voltage is applied to the charging member 2. The DC voltage applied to the charging member 2 may preferably be −2,000 V to +2,000 V. In addition to the DC voltage, an AC voltage may be further applied to the charging member 2** so that a pulsating current voltage is applied. The AC voltage superimposed on the DC voltage may preferably be a voltage having a peak-to-peak voltage of 4,000 V or less.

The photosensitive member 1 thus charged is then photoimagewise exposed to light L (slit exposure or laser beam scanning exposure) by the operation of an imagewise exposure means 12. As a result, electrostatic latent images corresponding to the exposed images are successively formed on the periphery of the photosensitive member. The electrostatic latent images thus formed are subsequently developed by toner by the operation of a developing means 6. The resulting toner-developed images are then successively transferred by the operation of a transfer charging means 8, to the surface of a recording medium 4 fed from a paper feed section (not shown) to the part between the photosensitive member 1 and the transfer charging means 8 in the manner synchronized with the rotation of the photosensitive member 1. The recording medium 4 on which the images have been transferred is separated from the surface of the photosensitive member, is led through an image fixing means (not shown), where the images are fixed, and is then delivered to the outside.

The surface of the photosensitive member 1 after the transfer of images is brought to removal of the toner remaining after the transfer, using a cleaning means 9. Thus the photosensitive member is cleaned on its surface and then repeatedly used for the formation of images.

As an electrophotographic apparatus, the image forming apparatus may be constituted of a combination of plural components joined as one process unit from among the constituents such as the above photosensitive member and developing means so that the unit can be freely mounted on or detached from the body of the apparatus. For example, at least the photosensitive member 1, the charging member 2 and the developing means 6 may be held into one process unit 13 so that the unit 13 can be freely mounted or detached using a guide means such as rails provided in the body of the apparatus. The cleaning means 9 may be provided either inside or outside the process unit 13. Alternatively, at least the photosensitive member 1 and the charging means 2 may be held into a first process unit and at least the developing means 7 may be set as a second process unit so that the first process unit and the second process unit can be freely mounted or detached. The cleaning means 9 may be provided either inside or outside the first process unit.

To the charging means 2 and the transfer charging means 8, voltages are applied from a power source 10. The electric power source 10 is controlled by a control unit 11.

A layer thickness detecting means 15 disposed between the charging means 2 and the power source 10 detects electric currents flowing when charges are eliminated from the charged photosensitive member 1 to detect the thickness of a given film constituting the photosensitive layer. Thus, the time to change the electrophotographic photosensitive member can be found.

EXAMPLES

The present invention will be described below in greater detail by giving Examples. In the following, "part(s)" refers to "part(s) by weight".

Example 1

Using as a support an aluminum cylinder of 30 mm in outer diameter and 260 mm in length, a coating composition composed of the following materials was applied to the outer surface of this support by dip coating, followed by heat curing at 140° C. for 30 minutes to form a conductive layer of 15 μm thick.

| | |
|---|---|
| Conductive pigment: tin oxide coated titanium oxide | 10 parts |
| Resistance modifier pigment: titanium oxide | 10 parts |
| Binder resin: phenol resin | 10 parts |
| Leveling agent: silicone oil | 0.001 part |
| Solvent: methanol/methyl cellosolve in 1/1 weight ratio | 20 parts |

A solution prepared by dissolving 3 parts of N-methoxymethylated nylon and 3 parts of copolymer nylon in a mixed solvent of 65 parts of methanol and 30 parts of n-butanol was applied to the surface of the conductive layer by dip coating, followed by drying to form a subbing layer of 0.5 μm thick.

Next, 4 parts of TiOPc crystalline powder having strong peaks at diffraction angles of 2θ±0.2° of 9.0°, 14.2°, 23.9° and 27.1° as measured by CuKα X-ray diffraction, 2 parts of polyvinyl butyral resin (trade name: S-LEC BM, available from Sekisui Chemical Co., Ltd.) and 80 parts of cyclohexanone were dispersed for 6 hours in a sand mill grinder making use of glass beads of 1 mm diameter. To the resulting dispersion, 115 parts of methyl ethyl ketone was added to obtain a charge generation layer coating dispersion. This coating dispersion was applied to the surface of the subbing layer by dip coating, followed by drying to form a charge generation layer of 0.3 μm thick.

Next, 7 parts of an amine compound of the formula (I) shown below, 3 parts of an amine compound of the formula (II) shown below and 10 parts of a bisphenol-Z polycarbonate resin with a viscosity average molecular weight of 15,000 were dissolved in a mixed solvent of 50 parts of monochlorobenzene and 10 parts of dichloromethane to prepare a charge transport layer coating solution (A).

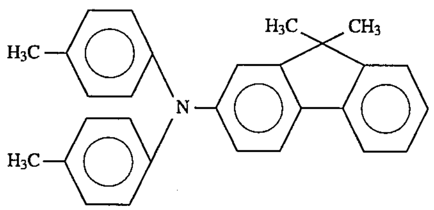

(I)

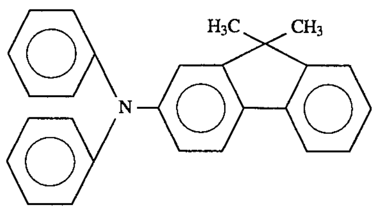

(II)

A charge transport layer coating solution (B) was prepared in the same manner as the coating solution (A) except that the bisphenol-Z polycarbonate resin with a viscosity average molecular weight of 15,000 was replaced with a bisphenol-Z polycarbonate resin with a viscosity average molecular weight of 20,000.

Then, in the same manner as the above coating solution (B), charge transport layer coating solutions (C), (D), (E) and (F) were prepared using a bisphenol-Z polycarbonate resin with a viscosity average molecular weight of 25,000, a bisphenol-Z polycarbonate resin with a viscosity average molecular weight of 30,000, a bisphenol-Z polycarbonate resin with a viscosity average molecular weight of 35,000 and a bisphenol-Z polycarbonate resin with a viscosity average molecular weight of 40,000, respectively.

Thus, the coating solution (A) was first applied to the surface of the charge generation layer by dip coating, followed by drying to form a charge transport layer of 4 μm thick.

The surface of this charge transport layer was subjected to fuming with dichloromethane, and the coating solution (B) was applied to that surface in the same manner as the coating solution (A) to form a charge transport layer of 4 μm thick. Then, in the same manner as the above, charge transport layers of 4 μm thick each were formed using the coating solutions (C) to (F) in the order of from (C) to (F) to finally form a charge transport layer of 24 μm in total layer thickness. Here, the outermost charge transport layer (the layer formed using the coating solution (F), was dried for 40 minutes.

In regard to the electrophotographic photosensitive member of the present invention, thus obtained, viscosity average molecular weight was measured for each 2 μm in depth from the surface toward the interior. The viscosity average molecular weight was calculated from measurements obtained by an Ostwald viscometer. Results obtained were as shown in Table 1.

TABLE 1

| Depth from the surface in unused state | Viscosity average molecular weight |
|---|---|
| 0 to 2 μm | 40,000 |
| 2 to 4 μm | 37,000 |
| 4 to 6 μm | 35,000 |
| 6 to 8 μm | 33,500 |
| 8 to 10 μm | 31,000 |
| 10 to 12 μm | 26,500 |
| 12 to 14 μm | 24,000 |
| 14 to 16 μm | 22,000 |
| 16 to 18 μm | 20,000 |
| 18 to 20 μm | 18,000 |
| 20 to 22 μm | 16,000 |
| 22 to 24 μm | 15,000 |

This electrophotographic photosensitive member was also set to the printer, Laser Jet 4 Plus, previously set forth and printing was carried out to evaluate its running performance and scrapability. The scrapability was evaluated in respect of (1) scrapability after printing in an unused state of the photosensitive member up to printing on 500 sheets of recording paper (hereinafter "initial scrapability") and (2) scrapability at the time the total depth of scrape-off after printing in the unused state has become larger than 10 μm (hereinafter "interior scrapability"). Results of the evaluation were as shown in Table 2.

Comparative Example 1

An electrophotographic photosensitive member was produced in the same manner as in Example 1 except that the charge transport layer was formed using only the coating solution (A) of Example 1. The charge transport layer was formed in a thickness of 24 μm, under drying conditions of 105° C. for 1 hour.

In regard to the electrophotographic photosensitive member thus obtained, the running performance and scrapability were evaluated in the same manner as in Example 1. Results of the evaluation were as shown in Table 2.

Comparative Example 2

An electrophotographic photosensitive member was produced in the same manner as in Comparative Example 1 except that the coating solution (A) used therein was replaced with the coating solution (E) of Example 1.

In regard to the electrophotographic photosensitive member thus obtained, the running performance and scrapability were evaluated in the same manner as in Example 1. Results of the evaluation were as shown in Table 2.

TABLE 2

| Running performance | | Scrapability Initial (μm) | Scrapability Interior (μm) |
|---|---|---|---|
| Example: | | | |
| 1 | Good prints on 20,000 sheets of recording paper. | 0.4 | 0.7 |
| Comparative Example: | | | |
| 1 | Great depth of scrape-off of photosensitive member. Fog occurred at printing on 12,000th sheet of recording paper. | 1.1 | 1.2 |
| 2 | Toner melt-adhered to photosensitive member at printing on 6,000th sheet of recording paper. | 0.5 | 0.4 |

Example 2

Using the structural units (A) and (B) shown below, six kinds of copolymers (1) to (6) were synthesized in the polymerization ratio as shown in Table 3. In Table 3, glass transition points (Tg) of the respective copolymers (1) to (6) are shown together. The copolymers (1) to (6) all had a viscosity average molecular weight of 20,000.

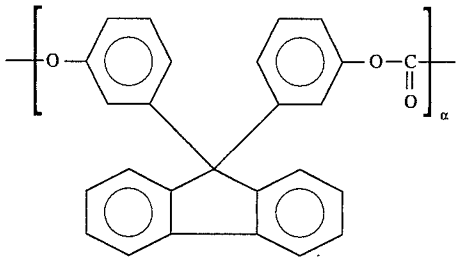

(A)

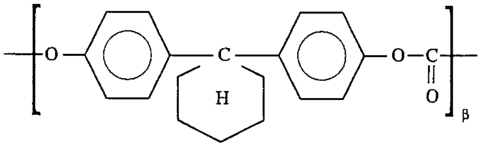

(B)

(α and β are each an integer)

TABLE 3

| Copolymer | Ratio of: A (mol %) | Ratio of: B (mol %) | Tg (°C.) |
|---|---|---|---|
| (1) | 50 | 50 | 210 |
| (2) | 33 | 67 | 199 |
| (3) | 20 | 80 | 176 |
| (4) | 10 | 90 | 170 |
| (5) | 5 | 95 | 169 |
| (6) | 0 | 100 | 165 |

Next, a charge transport layer coating solution (1) was prepared in the same manner as the coating solution of Example 1 except that the bisphenol-Z polycarbonate resin in the charge transport layer coating solution used therein was replaced with the copolymer (1) used as a binder. Similarly, charge transport layer coating solutions (2) to (6) were prepared using the copolymers (2) to (6), respectively.

Using the coating solutions thus prepared, an electrophotographic photosensitive member of the present invention was produced in the same manner as in Example 1 except that the coating solution (A) used therein was replaced with the coating solution (1), the coating solution (B) with the coating solution (2), and then similarly the coating solutions (C) to (F) with coating solutions (3) to (6), respectively.

This electrophotographic photosensitive member has glass transition points increasing in the direction from the surface toward the interior.

In regard to the electrophotographic photosensitive member thus obtained, the running performance and scrapability were evaluated in the same manner as in Example 1. Results of the evaluation were as shown in Table 4.

Comparative Example 3

An electrophotographic photosensitive member was produced in the same manner as in Example 2 except that the charge transport layer was formed using only the coating solution (3) of Example 2. The charge transport layer was formed in a thickness of 24 μm, under drying conditions of 105° C. for 1 hour.

In regard to the electrophotographic photosensitive member thus obtained, the running performance and scrapability were evaluated in the same manner as in Example 1. Results of the evaluation were as shown in Table 4.

Comparative Example 4

An electrophotographic photosensitive member was produced in the same manner as in Comparative Example 3 except that the coating solution (3) used therein was replaced with the coating solution (5) of Example 2.

In regard to the electrophotographic photosensitive member thus obtained, the running performance and scrapability were evaluated in the same manner as in Example 1. Results of the evaluation were as shown in Table 4.

TABLE 4

| Running performance | | Scrapability Initial (μm) | Scrapability Interior (μm) |
|---|---|---|---|
| Example: | | | |
| 2 | Good prints on 18,000 sheets of recording paper. | 0.6 | 1.2 |
| Comparative Example: | | | |
| 3 | Great depth of scrape-off of photosensitive member. Fog occurred at printing on 9,000th sheet of recording paper. | 1.1 | 1.2 |
| 4 | Toner melt-adhered to photosensitive member at printing on 7,000th sheet of recording paper. | 0.7 | 0.8 |

Example 3

In a mixed solvent of 90 parts of monochlorobenzene and 20 parts of dichloromethane, 7 parts of the same amine compound of formula (I) as used in Example 1, 3 parts of an amine compound of the formula (III) shown below and 10 parts of bisphenol-Z polycarbonate resin with a viscosity average molecular weight of 20,000 were dissolved, followed by further addition of 1 part of tetrafluoroethylene powder to prepare a charge transport layer coating solution (i).

(III)

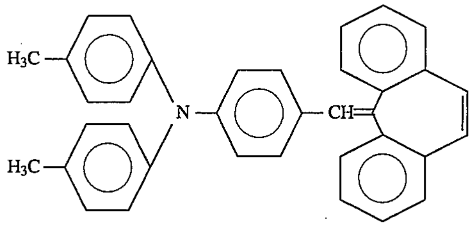

A coating solution (ii) was prepared in the same manner as the coating solution (i) except that the tetrafluoroethylene powder was added in an amount of 2 parts. Then, coating solutions (iii), (iv), (v) and (vi) were prepared in the same manner as the above except that the tetrafluoroethylene powder was added in an amount of 3 parts, 4 parts, 5 parts or 6 parts, respectively.

On the same support as used in Example 1, a conductive layer, a subbing layer and a charge generation layer were formed in the same manner as in Example 1, and the coating solution (i) was applied to the surface of the charge generation layer by spray coating. Next, before the coating of the coating solution (i) dried, the coating solution (ii) was applied onto the coating of the coating solution (i) by spray coating. Then, similarly, the coating solutions (iii), (iv), (v) and (vi) were each applied in this order by spray coating, finally followed by drying at 105° C. for 1 hour. Thus, an electrophotographic photosensitive member of the present invention was obtained, having a 24 μm thick charge transport layer with a tetrafluoroethylene powder content decreasing in the direction from its surface toward its interior.

In regard to the electrophotographic photosensitive member thus obtained, the running performance and scrapability were evaluated in the same manner as in Example 1. Results of the evaluation were as shown in Table 5.

Comparative Example 5

An electrophotographic photosensitive member was produced in the same manner as in Example 3 except that the charge transport layer was formed using only the coating solution (iii) of Example 2. The charge transport layer was formed in a thickness of 24 μm.

In regard to the electrophotographic photosensitive member thus obtained, the running performance and scrapability were evaluated in the same manner as in Example 1. Results of the evaluation were as shown in Table 5.

TABLE 5

| | Running performance | Scrapability Initial (μm) | Scrapability Interior (μm) |
|---|---|---|---|
| Example: | | | |
| 3 | Good prints on 30,000 sheets of recording paper. | 0.3 | 0.5 |
| Comparative Example: | | | |
| 5 | Toner melt-adhered to photosensitive member at printing on 16,000th sheet of recording paper. | 0.4 | 0.4 |

What is claimed is:

1. An image forming apparatus comprising an electrophotographic photosensitive member, a charging member for electrostatically charging the electrophotographic photosensitive member, an exposure means for exposing the electrophotographic photosensitive member thus charged to form an electrostatic latent image, a developing means using a toner to form a toner image from the electrostatic latent image on the electrophotographic photosensitive member, and a cleaning means for cleaning and scraping the surface of the electrophotographic photosensitive member, the electrophotographic photosensitive member comprising a support and a photosensitive layer provided thereon, which layer has a portion with a scrapability increasing in the direction from the surface toward the interior thereof and the surface of the electrophotographic photosensitive member prior to use being scrapable to a depth from 0.3 μm to 0.9 μm after 500 sheets of recording paper have been printed.

2. The image forming apparatus according to claim 1, which further comprises a layer thickness detecting means for detecting the layer thickness of the photosensitive layer of said electrophotographic photosensitive member.

3. A process unit comprising:

an electrophotographic photosensitive member together with at least one of an electrophotographic charging member, an electrophotographic developing means and an electrophotographic cleaning means combined into one unit, the unit being freely attachable to and detachable from an image forming apparatus, the electrophotographic photosensitive member comprising a support and a photosensitive layer provided thereon, which layer has a portion with a scrapability increasing in the direction from the surface toward the interior thereof, and the surface of the electrophotographic photosensitive member prior to use being scrapable to a depth from 0.3 μm to 0.9 μm after 500 sheets of recording paper have been printed.

4. The image forming apparatus according to claim 1, wherein the scrapability increases 1.2 to 3.0 times for each 10 μm advance in the direction from the surface of the photosensitive layer toward the inside thereof.

5. The image forming apparatus according to claim 1, wherein the scrapability is increased by gradually reducing molecular weights of the constituents of the photosensitive layer in the direction from the surface toward the interior thereof.

6. The image forming apparatus according to claim 1, wherein the scrapability is increased by gradually increasing glass transition points of the constituents of the photosensitive layer in the direction from the surface toward the interior thereof.

7. The image forming apparatus according to claim 1, wherein said photosensitive layer contains a fluorine resin and the scrapability is increased by gradually reducing the content of the fluorine resin in the direction from the surface of the photosensitive layer toward the interior thereof.

8. The image forming apparatus according to claim 1, wherein the charging means contacts the electrophotographic photosensitive member.

9. The image forming apparatus according to claim 1, wherein the cleaning means includes a cleaning blade.

10. The process unit according to claim 3, wherein the scrapability increases 1.2 to 3.0 times for each 10 μm advance in the direction from the surface of the photosensitive layer toward the inside thereof.

11. The process unit according to claim 3, wherein the scrapability is increased by gradually reducing molecular weights of the constituents of the photosensitive layer in the direction from the surface toward the interior thereof.

12. The process unit according to claim 3, wherein the scrapability is increased by gradually increasing glass transition points of the constituents of the photosensitive layer in the direction from the surface toward the interior thereof.

13. The process unit according to claim 3, wherein the photosensitive layer contains a fluorine resin and the scrapability is increased by gradually reducing the content of the fluorine resin in the direction from the surface of the photosensitive layer toward the interior thereof.

14. The process unit according to claim 3, wherein the charging means contacts the electrophotographic photosensitive member.

15. The process unit according to claim 3, wherein the cleaning means includes a cleaning blade.

* * * * *